(12) United States Patent
Haapala et al.

(10) Patent No.: US 9,761,258 B2
(45) Date of Patent: Sep. 12, 2017

(54) SERVO PARAMETERIZATION FOR MULTI-SENSOR READER

(71) Applicant: Seagate Technology LLC, Cupertino, CA (US)

(72) Inventors: Kenneth A. Haapala, Plymouth, MN (US); Joshua Christensen, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 256 days.

(21) Appl. No.: 14/457,733

(22) Filed: Aug. 12, 2014

(65) Prior Publication Data

US 2016/0049169 A1    Feb. 18, 2016

(51) Int. Cl.
| | | |
|---|---|---|
| G11B 21/02 | (2006.01) | |
| G11B 5/596 | (2006.01) | |
| G11B 5/265 | (2006.01) | |
| G11B 20/12 | (2006.01) | |

(52) U.S. Cl.
CPC ........ G11B 5/59688 (2013.01); G11B 5/2652 (2013.01); G11B 5/59655 (2013.01); G11B 20/1217 (2013.01); G11B 2020/1281 (2013.01)

(58) Field of Classification Search
None
See application file for complete search history.

(56) References Cited

U.S. PATENT DOCUMENTS

| | | | |
|---|---|---|---|
| 6,262,857 B1 | 7/2001 | Hull et al. | |
| 6,493,176 B1 | 12/2002 | Deng et al. | |
| 6,909,566 B1 * | 6/2005 | Zaitsu et al. | 360/31 |
| 7,405,893 B2 | 7/2008 | Bi et al. | |
| 7,502,193 B2 * | 3/2009 | Albrecht et al. | 360/75 |
| 7,679,858 B2 * | 3/2010 | Winarski et al. | 360/77.12 |
| 7,688,540 B1 | 3/2010 | Mei et al. | |
| 8,031,427 B2 | 10/2011 | Kim et al. | |
| 8,724,245 B1 | 5/2014 | Smith et al. | |
| 8,873,178 B2 * | 10/2014 | Erden et al. | 360/39 |
| 2010/0297364 A1 | 11/2010 | Cho et al. | |

* cited by examiner

Primary Examiner — K. Wong
(74) Attorney, Agent, or Firm — Holzer Patel Drennan

(57) ABSTRACT

A storage media includes a plurality of servo sectors with embedded servo patterns characterized by one or more servo pattern parameters. Each of the servo sectors has a servo pattern parameter based on a separation between read sensors of a transducer head reading the servo sector.

18 Claims, 6 Drawing Sheets

SERVO PARAMETERIZATION FOR MULTI-SENSOR READER

BACKGROUND

A hard drive disc (HDD) may include a magnetic media with a number of data tracks including one or more servo sectors storing positioning information. Before reading data from or writing data to a data track of the HDD, one or more read sensors of the HDD reads a servo pattern from a servo sector of the data track. Using the servo pattern, the HDD generates a position error signal (PES) that can be used to maintain centerline tracking of a transducer head along the data track during the read or write operation.

SUMMARY

According to one implementation, a storage media has a plurality of servo patterns in a plurality of servo sectors. Each of the servo patterns is characterized by a servo pattern parameter based on a separation between read sensors of a transducer head when the transducer head reads the servo pattern.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
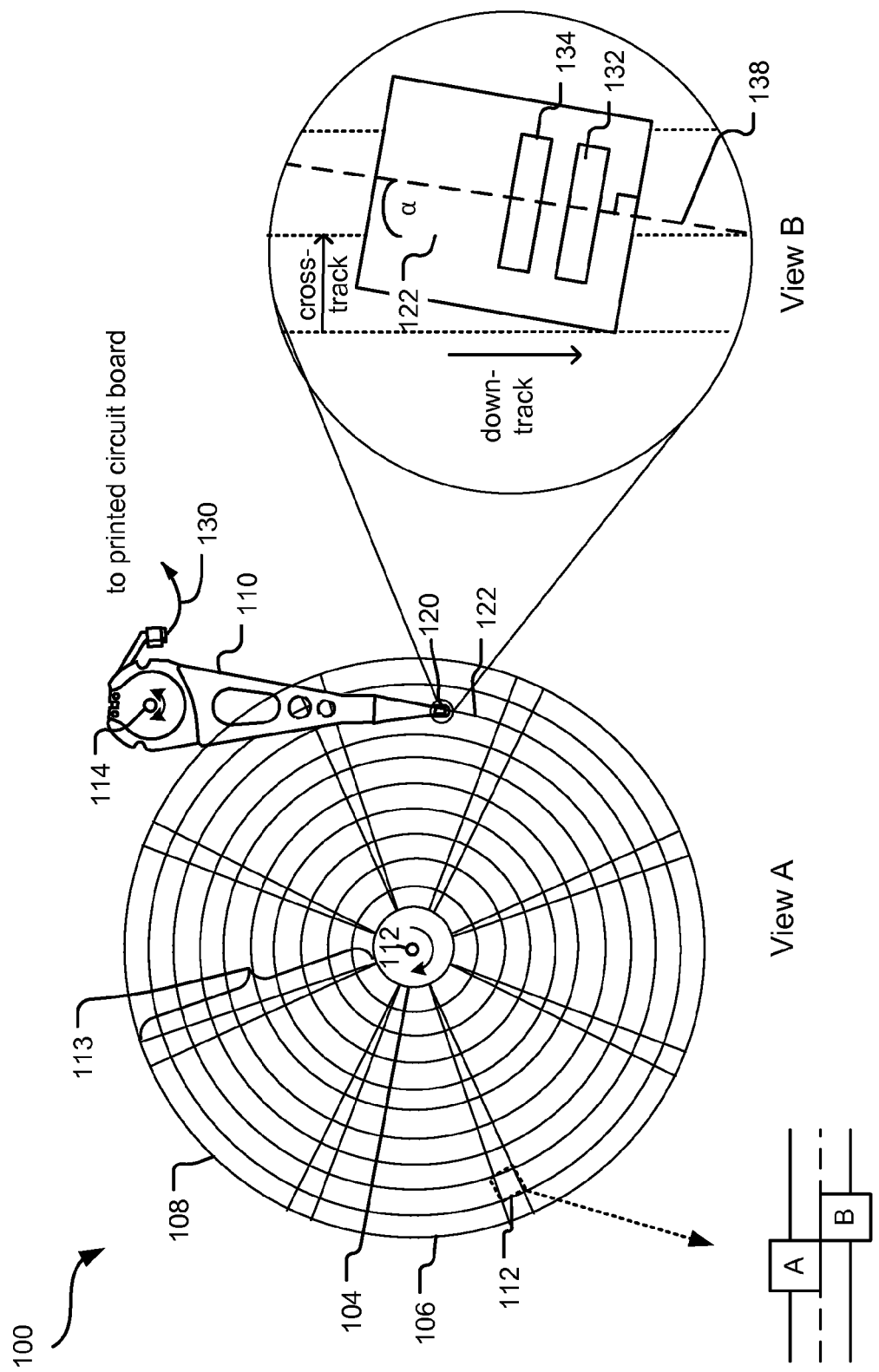
FIG. 1 illustrates a plan view of an example disc drive assembly including a transducer head on a distal end of an actuator arm positioned over a media.

FIG. 1 illustrates a plan view of an example storage device 100 including a transducer head 120 on a distal end of an actuator arm 110 positioned over a media 108. Although the media 108 is shown to be a disc, the media 108 may, in other implementations, be any type of computer-readable storage memory excluding non-tangible memory types such as carrier waves and other signal transport mechanisms. During operation of the storage device 100, the transducer head 120 flies in close proximity about the surface of the media 108, while the media 108 is rotated by a spindle motor that rotates about an axis of rotation 112.

A rotary voice coil motor that rotates about an actuator axis of rotation 114 is typically used to position the transducer head 120 on a target data track (e.g., a data track 122) of the media 108 while one or more transducers (e.g., read or write elements) of the transducer head 120 read data from and write data to the target data track. A flex cable 130 provides the requisite electrical connection paths for the transducer head 120 while allowing pivotal movement of the actuator arm 110 during operation. The flex cable 130 connects a printed circuit board (PCB) (not shown) to the transducer head 120 and routes along the actuator arm 110 from the PCB to the transducer head 120. In other implementations, there is more than one transducer head 120, actuator arm 110, and/or media 108 in the storage device 100.

Referring specifically to View A, the media 108 includes a number of servo sectors (e.g., a servo sector 112) arranged in rows (e.g., a row 113) extending radially between an inner diameter 104 and an outer diameter 106. In one implementation, each of the servo sectors includes embedded information used for track seeking and track following. In particular, each servo sector contains a "servo pattern" including a group of servo bursts (e.g., a servo pattern including an example A-B burst, as illustrated in View C). For example, each of the individual bursts in each servo pattern includes a number of consecutive transitions recorded at precise intervals and offsets with respect to a data track centerline.

View B shows an exploded view of the transducer head 120 including two read sensors (e.g., read sensors 132 and 134). During read and write operations, the read sensors 132 and 134 read the embedded servo patterns while accessing an individual data track. The servo patterns provide fine head position information used for centerline tracking. Although the servo patterns in View C of FIG. 1 include two offset bursts of transitions (e.g., bursts A and B), other implementations may include different numbers of offset bursts (e.g., "A, B, C" bursts; "A, B, C, D" bursts; etc.). In other implementations, the transducer head 120 includes more than two read sensors. The read sensors may be arranged relative to one another in a variety of different configurations and offsets.

At some radial locations, an axis 138 of the transducer head 120 is angled relative to a target data track (e.g., by an angle $\alpha$, as shown). This angle is commonly referred to as the skew angle. The skew angle ($\alpha$) of the transducer head 120 varies as the transducer head 120 moves radially across the media 108 between the inner diameter 104 and the outer diameter 106. Different skew angles ($\alpha$) may be associated with different orientations of the read sensors 132 and 134 relative to the media 108. For example, a separation between the read sensors 132 and 134 can be defined relative to the media 108 by a separation in a down-track direction and also by a separation in a cross-track direction.

At some skew angles of the transducer head 120, one or more of the individual read sensors may be in better position to read servo data from an underlying servo sector (e.g., a servo sectors 112) than other read sensor(s) of the transducer head 120. Therefore, a transducer head with multiple read sensors may allow for generation of a more accurate position error signal (PES) than a PES achieved via a transducer head with a single read element.

PES quality is associated with the servo pattern length, the servo pattern density, and the radial spacing between different servo patterns on the media 108. In some implementations, servo pattern parameters can be manipulated to increase PES quality. For example, one or more servo pattern lengths, densities, and radial spacing (e.g., as a function of reader width) can be selected to influence a resulting PES signal. However, gains in PES quality may be provided at the cost of decreased format efficiency and increased time to read the servo patterns on the media 108. For example, increasing servo pattern length or decreasing the radial spacing between servo patterns may improve centerline tracking of the transducer head 120 but inefficiently allocate storage space on the media 108.

Format efficiency may, in theory, be improved by increasing servo pattern density. "Servo pattern density" refers to the spacing between magnetic transitions on a disk, and may also be referred to as a pattern frequency that is electrically observed by a read sensor of the transducer head 120. However, when the magnetic transitions are packed together too tightly, some read elements may not be able to properly identify each individual transition, causing read errors. Therefore, increasing servo pattern density is, in some implementations, associated with a proportional increase in bit error rate (BER). This increased BER is particularly prominent in storage devices that include a single read element on each transducer head.

According to one implementation, the disclosed technology utilizes multiple readers on the transducer head 120 in conjunction with manipulated servo pattern parameters to improve format efficiency of the media 108 without decreasing the accuracy of centerline tracking of the transducer head 120 and without increasing the BER of the storage device. The forgoing can be achieved by selecting servo pattern parameters for each servo sector (e.g., the servo sectors 112) based on a corresponding cross-track separation between read sensors of the transducer head. When, for example, the cross-track separation between read sensors is large, the read sensors simultaneously read more data from the media 108 than when the cross-track separation between the read sensors is small. Consequently, servo pattern density and radial spacing can be increased, and servo pattern length can be decreased without decreasing tracking accuracy or increasing the BER of the storage device.

Figure 2:
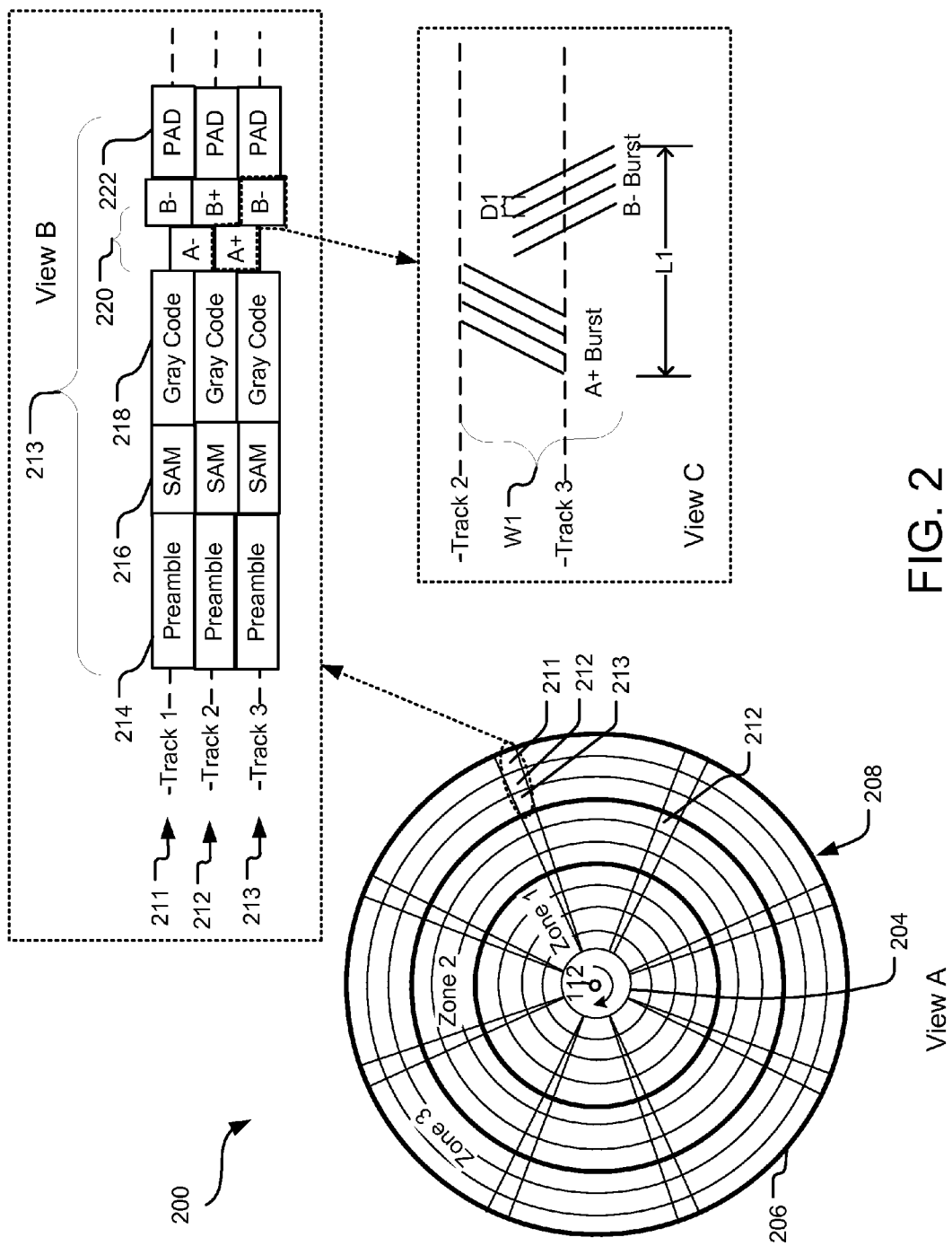
FIG. 2 illustrates an example media including servo sectors with servo pattern parameters based on a corresponding separation between read sensors of a transducer head.

FIG. 2 illustrates an example disc drive assembly 200 with a media 208 including servo sectors (e.g., servo sectors 211, 212, and 213). In one implementation, each of the servo sectors is characterized by one or more servo pattern parameters based on a corresponding separation between read sensors of a transducer head. An exploded view of the servo sectors 211, 212, and 213 is illustrated in View B, including a number of elements within each servo sector. In particular, each of the servo sectors on the media 208 includes a preamble 214, a servo address mark (SAM) 216, gray code 218, a servo pattern 220, and a PAD 222. The preamble 214 is referred to as a servo sync and provides a clock sync during reading of the servo information and simultaneously provides a gap to the front of the servo sector to indicate a beginning of the servo sector. The servo address mark 216 provides a sync to indicate the start of the servo data and points to the gray code 218 that follows. That is, the SAM 216 is provided as a reference point to generate various timing pulses related to servo control. The gray code 218 provides information about the corresponding data track (e.g., Track 1). The servo pattern 220 provides a position error signal (PES) used to seek and follow a data track of the media 208. The PAD 222 provides a transition margin from the servo sector to the following data sector. In other implementations, each of the servo sectors of the media 208 may include other elements instead of or in addition to those elements shown in FIG. 2.

In one implementation, a PES value is used as an input to a servo control loop and used to adjust the positioning of the transducer head. The PES refers to difference between a reference (e.g., target track) position and a measured track position. In one implementation, the measured position is determined from a demodulated read signal of the transducer head based on a combination of the grey code 218 (e.g., Track ID) and A/B bursts, where the bursts provide a fractional position between each set of reference tracks.

The servo pattern 220 is characterized by a set of servo pattern parameters, some of which are shown in detail in View C. For example, the servo pattern 220 is characterized by a servo pattern length L1, measured in the down-track direction of the media 208. The servo pattern length indicates a length of the burst pattern in a down-track direction. Servo patterns with longer servo pattern lengths may take longer to read than servo patterns with shorter servo pattern lengths. When there are multiple read sensors on a transducer head reading a data track, servo pattern lengths can be selectively decreased in some servo sectors relative to other servo sectors on the media 208 without decreasing the quality of the resulting PES generated at each servo sector.

The servo pattern 220 is also characterized by a servo pattern density, which is a quantity proportional to a distance D1 between pattern stripes. In some implementations, increasing the servo pattern density can increase quality of a resulting PES. However, increasing the pattern density can, in some implementations, also increase a bit error rate (BER) of a storage device due to the inability of one or more read sensors to decipher the individual transitions of the servo pattern 220. When there are multiple read sensors on a transducer head reading a data track, higher servo pattern densities can be used in some servo sectors without increasing the BER.

In addition to the above servo pattern parameters, the servo pattern 220 is also characterized by a pattern width W1. The pattern width W1 is used to compute a number of servo tracks per inch (STPI) in a radial direction across the media 208. STPI is inversely proportional to radial spacing between servo patterns. When there are multiple read sensors on a transducer head reading a data track, the STPI can be manipulated without degrading the quality of PES generated while reading or writing to those storage areas. In one implementation, STPI is increased to improve position accuracy. In another implementation, STPI is decreased to decrease time necessary to write the servo pattern to the media. Decreasing the STPI may be performed, in some cases, without significantly altering quality of a resulting PES. For example, a device with a multi-reader transducer head and a media with a decreased STPI may generate PES of comparable or better quality than a PES generated by a device with a single-reader transducer head and a media with an increased STPI.

In addition to servo pattern length, servo pattern density, and STPI, the servo pattern 220 may be characterized by other servo pattern parameters, including without limitation number of preamble cycles (transitions), number of bits of SAM, number of bits of gray code, number of cycles of position bursts, etc. In other implementations, one or more of these servo pattern parameters are selectively varied.

In FIG. 2, data tracks of the media 208 are grouped into three different physical zones between the inner diameter 204 of the media (ZONE 1) to an outer diameter 206 of the media (ZONE 3). In other implementations, the media 208 may be grouped into greater than or fewer than three different zones. Each of the zones of the media 208 corresponds to defined range of skew angles of a transducer head for reading data from the media 208. Each of the skew angles of the transducer head is further associated with a defined separation between read sensors on the transducer head relative to a target data track on the media 208. The relationship between skew angle and separation of read sensors may vary depending on the exact configuration of read sensors on the transducer head. In some implementations, large skew angles may correspond to large separations between read sensors. In other implementations, large skew angles may correspond to small separations between read sensors.

In one implementation, one or more servo pattern parameters of a servo sector are selected based on a zone of the media 208 where the servo sector is located. If, for example, the cross-track separation between read sensors is greater in zones 1 and 3 than in zone 2, one or more of the following may result: (1) zones 1 and 3 may be associated with servo pattern length that is decreased as compared to zone 2; (2) zones 1 and 3 may be associated with servo pattern density that is increased as compared to servo pattern density in zone 2; and/or (3) zones 1 and 3 may be associated with an STPI that is decreased as compared to the STPI of servo sectors in zone 2.

If, on the other hand, the cross-track separation between the read sensors is greater in zone 2 than in either of zones 1 and 3, one or more of the following may result: (1) zone 2 may be associated with a servo pattern length that is decreased as compared to zones 1 and 3; (2) zone 2 may be associated with a pattern density that is increased as compared to either of zones 1 and 3; and/or (3) zone 2 may be associated with a smaller STPI than either of zones 1 or 3.

In still other implementations, different read element orientations and/or increased numbers of read sensors on the transducer head may allow for different selections of servo pattern parameters to achieve a balance between PES quality, servo read errors, and servo read time. A few example read element separations are explored in greater detail in FIGS. 3A, 3B, 4A, and 4B.

Figure 3B:
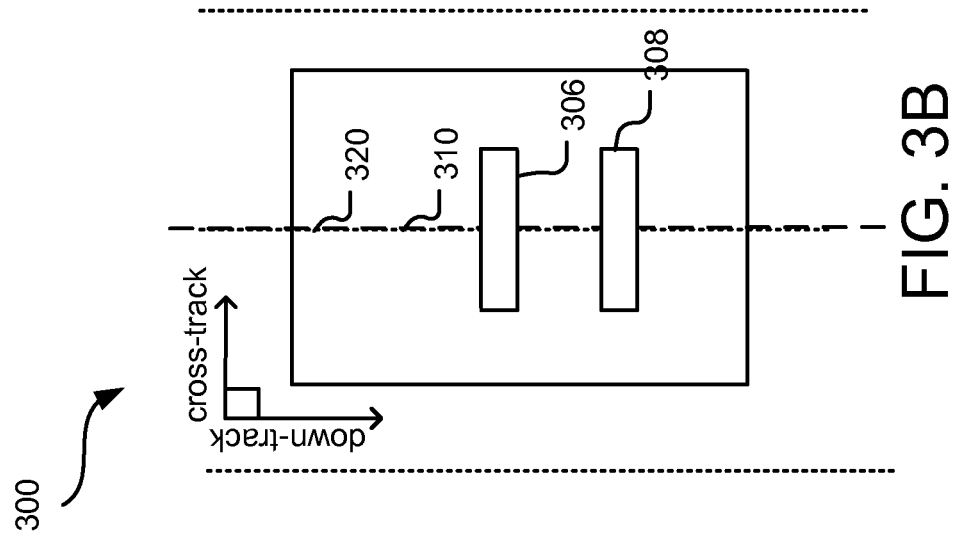
FIG. 3B illustrates a zero skew angle position of an example transducer head with read sensors aligned along a longitudinal axis of the transducer head.
Figure 3A:
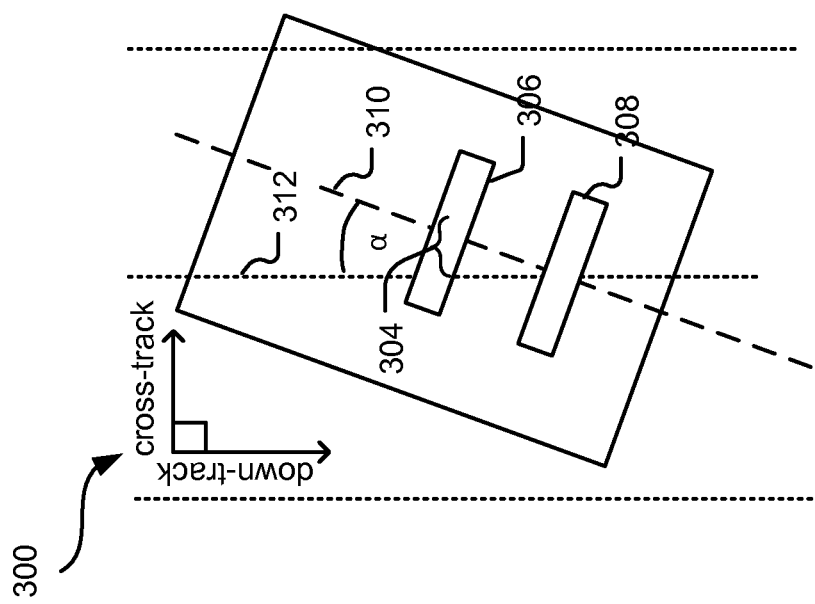
FIG. 3A illustrates a non-zero skew angle position of an example transducer head with read sensors aligned along a longitudinal axis of the transducer head.

FIGS. 3A and 3B illustrate example separations between read sensors on an example transducer head 300 at different skew angles. FIG. 3A illustrates a non-zero skew angle (α) position of an example transducer head 300 including two read sensors (e.g., read sensors 306 and 308) aligned along a longitudinal axis 310 of the transducer head 300. The non-zero skew angle α represents an angle between the longitudinal axis 310 of the transducer head 300 and a tangent to a target data track 312 on a media rotating below the transducer head 300. While the transducer head 300 is angled at the angle α as shown, the read sensors 306 and 308 read data from the target data track 312.

The non-zero skew angle α of FIG. 3A causes the centers of two read sensors 306 and 308 to have a cross-track separation represented by a distance 304. The term "cross-track separation" refers to a separation measured in the cross-track direction, as indicated by media axis in FIGS. 3A and 3B. As the skew angle of the transducer head 300 increases, the cross-track separation of the read sensors 306 and 308 increases proportionally. In contrast, the cross-track separation between the read sensors 306 and 308 decreases proportionally as the skew angle decreases and approaches zero.

FIG. 3B illustrates the transducer head 300 at a zero skew angle position. When the skew angle is zero, the longitudinal axis 310 of the transducer head 300 is substantially aligned with a target data track 320. Consequently, the cross-track separation between the centers of the read sensors 306 and 308 is zero or substantially zero. Different radial zones of the media may correspond to regions of high, low, or medium skew angles of the transducer head 300. In FIGS. 3A-3B, high skew angles correspond to increased cross-track separation between read sensors while low skew angles correspond to decreased cross-track separation between read sensors.

To increase PES quality and/or decrease servo sector read time, one or more servo pattern parameters of servo sectors of the media are selected based on the cross-track separation 304 between servo sectors. In one implementation, servo pattern density may be increased in proportion to increased cross-track read sensor separation. For example, servo sectors of the media in zones corresponding to large cross-track reader separations (e.g., as shown in FIG. 3A) may include servo patterns with increased servo pattern density as compared to servo pattern density in zones with smaller cross-track reader separations (e.g., as shown in 3B).

In another implementation, servo pattern length is decreased in proportion to increasing cross-track read sensor separation. For example, servo sectors of the media in zones corresponding to large cross-track reader separations may include servo patterns with a decreased servo pattern length as compared to servo pattern length in zones with smaller cross-track reader separations.

In yet another implementation, servo pattern radial spacing is increased in proportion to increasing cross-track read sensor separation. For example, servo patterns in zones corresponding to large cross-track reader separations may be spaced further apart from one another (e.g., have a decreased STPI) as compared to servo patterns in zones with smaller cross-track reader separations.

Figure 4B:
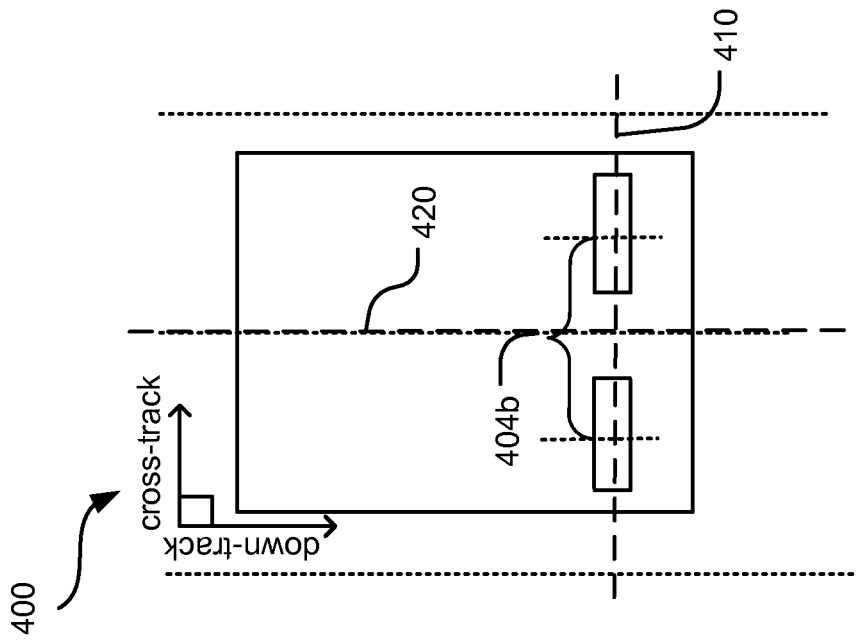
FIG. 4B illustrates a zero skew angle position of another example transducer head with read sensors aligned along a lateral axis of the transducer head.
Figure 4A:
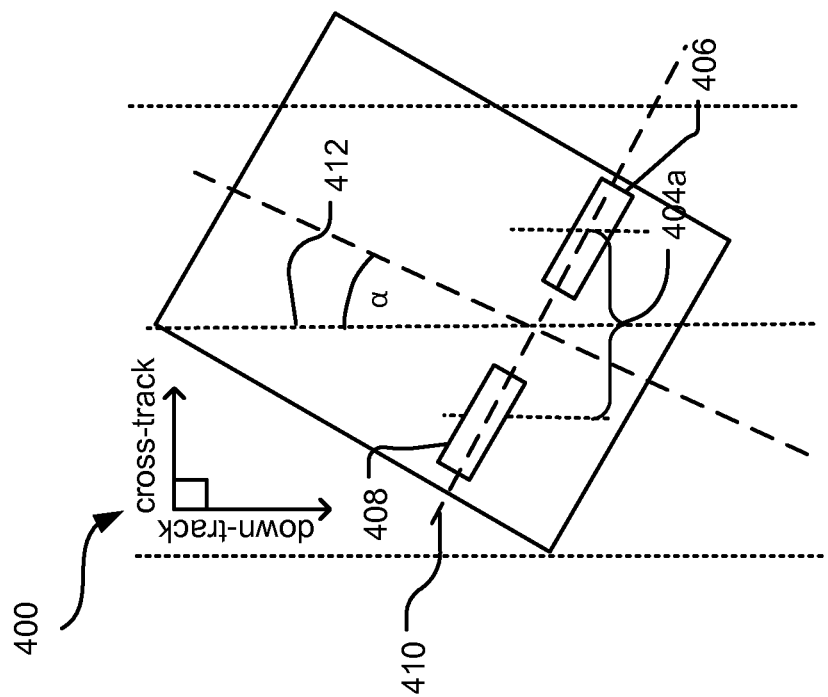
FIG. 4A illustrates a non-zero skew angle position of another example transducer head with read sensors aligned along a lateral axis of the transducer head.

FIGS. 4A and 4B illustrate example separations between read sensors on another example transducer head 400 at different skew angles. FIG. 4A illustrates a non-zero skew angle α position of the transducer head 400 including two read sensors (e.g., read sensors 406 and 408) aligned along a lateral axis 410 of the transducer head 400. The non-zero skew angle (α) represents an angle between the lateral axis 410 of the transducer head 400 and a tangent to a target data track 412 on a media (not shown) rotating below the transducer head 400. While angled at the angle α, the read sensors 406 and 408 read data from the target data track 412.

In FIG. 4A, the non-zero skew angle α causes the centers of two read sensors 406 and 408 to have a cross-track separation represented by a distance 404a. FIG. 4B illustrates the transducer head 400 at a zero skew angle position relative to a target data track 420. When the skew angle is zero, the lateral axis 410 of the transducer head 400 is substantially perpendicular to the target data track 420. Consequently, a cross-track separation 404b between the centers of the read sensors 406 and 408 is larger than the cross-track separation 404a observed at larger skew angles. Different radial zones of the media may correspond to regions of high, low, or medium skew angles of the transducer head 400. In FIGS. 4A-4B, high skew angles correspond to decreased cross-track separation between read sensors while low skew angles correspond to increased cross-track separation between read sensors.

To increase PES quality and/or decrease servo sector read time, one or more servo pattern parameters of servo sectors of the media are selected based on a cross-track separation (e.g., cross-track separation 404a, 404b). In one implementation, servo pattern density is increased in proportion to increased cross-track read sensor separation. For example, servo sectors of the media in zones corresponding to larger cross-track read sensor separations (e.g., as shown in 4B) may include servo patterns with increased servo pattern density as compared to servo pattern density in zones with smaller cross-track read sensor separations (e.g., as shown in FIG. 4A).

In another implementation, servo pattern length is decreased in proportion to increasing cross-track reader separation. For example, servo sectors of the media in zones corresponding to large cross-track read sensor separations may include servo patterns with a decreased servo pattern length as compared to servo pattern length in zones with smaller cross-track read sensor separations.

In yet another implementation, servo pattern radial spacing is increased (e.g., STPI is decreased) in proportion to increasing cross-track read sensor separation. For example, servo patterns in zones with increased cross-track reader separation (e.g., as in FIG. 4B) may be spaced closer to one another (e.g., have an increased STPI) as compared to servo patterns in zones where the cross-track separation of read sensors is decreased (e.g., as in FIG. 4A).

Figure 5:
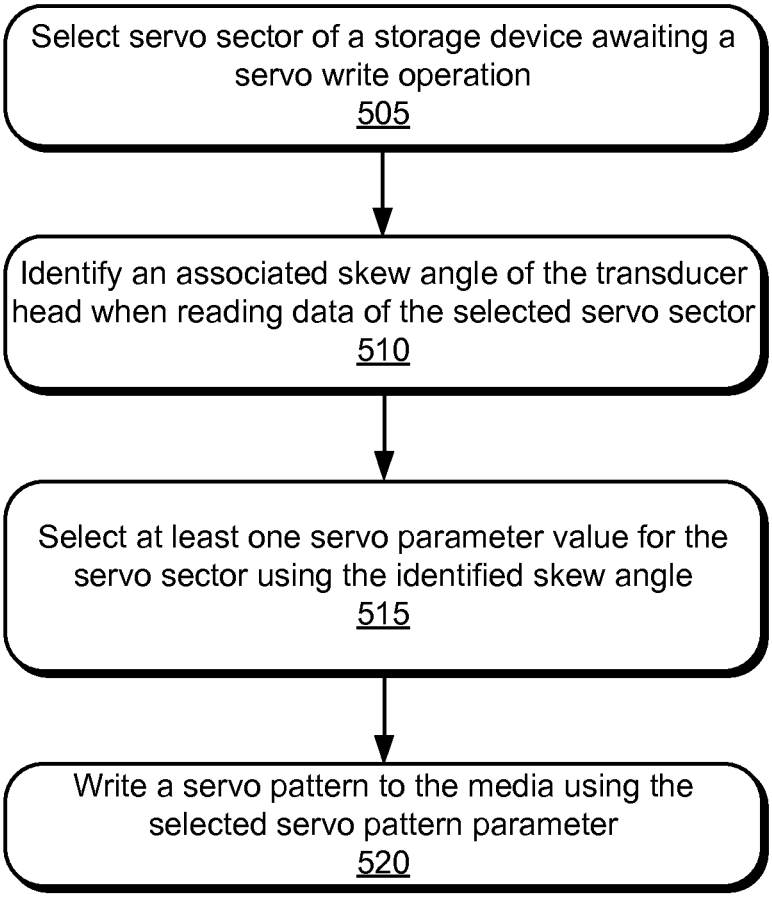
FIG. 5 illustrates example operations for writing a servo pattern to a servo sector on a media based on a separation between read sensors on a transducer head.

FIG. 5 illustrates example operations 500 for writing a servo pattern to a servo sector on a media based on a separation between read sensors on a transducer head. In one implementation, servo patterns on the media are written by a servo writer before the media is assembled in a storage device. In another implementation, servo patterns are written to the media after the media is assembled in a storage device.

A selection operation 505 selects a servo sector of the media for a servo write operation. An identification operation 510 identifies a skew angle of a transducer head associated with the selected servo sector. For example, a servo writer may consult a table associating skew angle of a transducer head with servo sectors on the media. Another selection operation 515 uses the identified skew angle to select at least one servo parameter value for the servo sector. For example, a servo writer may retrieve a servo parameter value from a table that associates the servo pattern parameter values with different skew angles of a transducer head. The table may include servo pattern parameter values such as servo pattern length, servo pattern density, and STPI. Prior to the time of the writing operations 500, the servo parameter values are selected for association with each of the skew angles based on an optimization and/or calibration routine that accounts for the cross-track separation between read elements of a transducer head at each of the skew angles. A write operation 520 writes a servo pattern to the selected servo sector using the selected servo parameter value.

Figure 6:
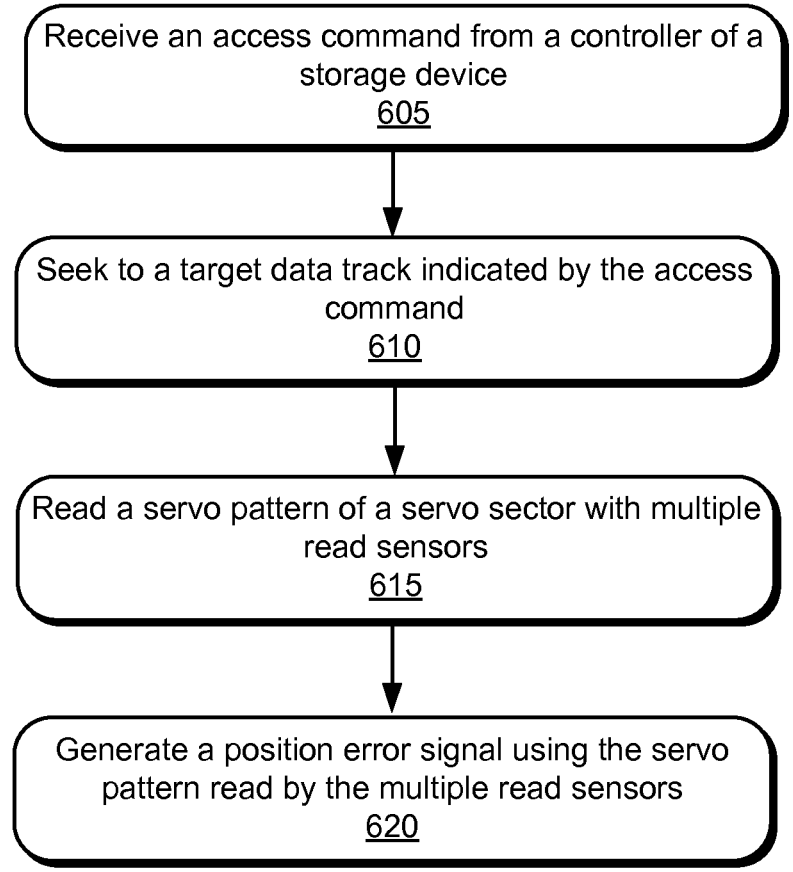
FIG. 6 illustrates example operations for generating a position error signal (PES) using a servo pattern based on a separation between read sensors on a transducer head.

FIG. 6 illustrates example operations 600 for generating a position error signal (PES) using a servo pattern based on a separation between read sensors on a transducer head. A receiving operation 605 receives an access command (e.g., a read or write command) from a storage controller of a storage device. The access command initiates a read operation or a write operation of a target data track of a media of the storage device.

A seeking operation 610 moves an actuator arm to position the transducer head of the storage device above the target data track. A reading operation 615 reads data from the target data track using two or more read sensors of the transducer head. The data read from the target data track includes a servo pattern of a servo sector. The servo pattern is characterized by at least one servo pattern parameter that is based on a cross-track separation between the multiple read sensors while reading the servo pattern. For example, the servo pattern may be characterized by one or more of a servo pattern length, servo pattern density, and STPI.

At least one of the servo pattern parameters of the servo pattern corresponds to a separation between the read sensors at the time that the transducer head reads the servo pattern. For example, a servo pattern density, servo pattern length, or STPI, may differ for different servo sectors of a media depending on the cross-track separation of read sensors when the servo sector is read. In one implementation, the cross-track separation between the read sensors of the transducer head is large while reading a servo sector, and the servo sector has a servo pattern density that is increased as compared to a servo pattern density of another servo sector associated with a smaller cross-track separation between the read sensors.

In another implementation, the cross-track separation between the read sensors is large while reading a servo sector, and the servo sector has a servo pattern length that is decreased as compared to a servo pattern length of another servo sector associated with a smaller cross-track separation between the read sensors. In still another implementation, the cross-track separation between read sensors of a transducer head is large while reading a servo sector, and the servo sector is in a zone that has a decreased number of STPI as compared to the number of STPI in another zone of the media associated with smaller cross-track separations between the read sensors.

A generation operation 620 uses the servo pattern read by the multiple read sensors to generate a PES and adjust the position of the transducer head with respect to the target data track.

The implementations of the invention described herein are implemented as logical steps in one or more computer systems. The logical operations of the present invention are implements (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting operations as desired, unless explicitly claimed otherwise or a specific order is inherently necessitated by the claim language.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:
1. A system comprising:
 a storage media with a plurality of servo patterns, each of the servo patterns characterized by a servo pattern parameter based on a separation between read sensors of a transducer head when the transducer head reads the servo pattern; and wherein the storage media further comprises a plurality of radial zones, each of the radial zones associated with a value of the servo pattern parameter that is different from the value of the servo pattern parameter associated with at least another one of the radial zones.

2. The system of claim 1, wherein the separation is a cross-track separation of the read sensors.

3. The system of claim 1, wherein the servo pattern parameter is a servo pattern density.

4. The system of claim 1, wherein the servo pattern parameter is servo tracks per inch (STPI).

5. The system of claim 1, wherein the servo pattern parameter is a servo pattern length.

6. The system of claim 1, wherein the servo pattern parameter is a servo pattern density and the storage media further comprises:
a first servo sector with a first servo pattern density associated with a first cross-track separation between the read sensors; and
a second servo sector with a second servo pattern density associated with a second cross-track separation between the read sensors, wherein the second cross-track separation is greater than the first cross-track separation and the second servo pattern density is greater than the first servo pattern density.

7. The system of claim 1, wherein the servo pattern parameter is a servo pattern length and the storage media further comprises:
a first servo sector with a first pattern length associated with a first cross-track separation between the read sensors; and
a second servo sector with a second servo pattern length associated with a second cross-track separation between the read sensors, wherein the second cross-track separation is greater than the first cross-track separation and the second servo pattern length is less than the first servo pattern length.

8. The system of claim 1, wherein the servo pattern parameter is a number of servo tracks per inch (STPI) and the storage media further comprises:
a first zone with a first STPI associated with a first range of cross-track separations between the read sensors; and
a second zone with a second STPI associated with a second range of cross-track separations between the read sensors, wherein the first range of cross-track separations is of greater magnitude than the second range of cross-track separations and the first STPI is less than the second STPI.

9. One or more computer-readable storage media encoding computer-executable instructions for executing on a computer system a computer process, the computer process comprising:
selecting at least one servo pattern parameter for a servo pattern of the storage media based on a separation between read sensors of a transducer head when the transducer head reads the servo pattern.

10. The one or more computer-readable storage medium of claim 9, wherein the servo pattern parameter is a servo pattern density.

11. The one or more computer-readable storage medium of claim 9, wherein the servo pattern parameter is a number of servo tracks per inch (STPI).

12. The one or more computer-readable storage medium of claim 9, wherein the servo pattern parameter is length of the servo pattern.

13. The one or more computer-readable storage medium of claim 9, wherein selecting the servo pattern parameter further comprises:
selecting a first servo pattern density for a servo sector associated with a first cross-track separation between the read sensors; and
selecting a second servo pattern density for a servo sector associated with a second cross-track separation between the read sensors, wherein the second cross-track separation is greater than the first cross-track separation and the second servo pattern density is greater than the first servo pattern density.

14. The one or more computer-readable storage medium of claim 9, wherein selecting the servo parameter further comprises:
selecting a first servo pattern length for a servo sector associated with a first cross-track separation between the read sensors; and
selecting a second servo pattern length for a servo sector associated with a second cross-track separation between the read sensors, wherein the second cross-track separation is greater than the first cross-track separation and the second servo pattern length is less than the first servo pattern length.

15. The one or more computer-readable storage medium of claim 9, wherein selecting the servo parameter further comprises:
selecting a first STPI for servo sectors within a first radial zone of the storage media; and
selecting a second STPI for servo sectors within another radial zone of the storage media, wherein the first radial zone is associated with a larger cross-track separation between the read sensors than the second radial zone and the first STPI is less than the second STPI.

16. One or more computer-readable storage media encoding computer-executable instructions for executing on a computer system a computer process, the computer process comprising:
reading a servo pattern during a media access operation, the servo pattern characterized by a servo pattern parameter selected based on a separation between read sensors of a transducer head when the transducer head reads the servo pattern;
generating a position error signal based on the servo pattern; and
wherein the storage media is divided into plurality of radial zones, each of the radial zones associated with a value of the servo pattern parameter that is different from the value of the servo pattern parameter of at least another one of the radial zones.

17. The one or more computer-readable storage medium of claim 16, wherein the separation is a cross-track separation of the read sensors.

18. The one or more computer-readable storage medium of claim 16, wherein the servo pattern parameter is at least one of servo pattern density, servo pattern length, and STPI.

* * * * *